United States Patent
Matsushita et al.

[11] Patent Number: 5,856,718
[45] Date of Patent: Jan. 5, 1999

[54] PRESSURIZATION DEVICE FOR THE ROTOR OF A MOTOR

[75] Inventors: Kunitake Matsushita; Takayuki Yamawaki; Hiroshi Sano; Hiroaki Ezure, all of Asaba-cho, Japan

[73] Assignee: Minebea Co., Ltd., Nagano, Japan

[21] Appl. No.: 947,387

[22] Filed: Oct. 8, 1997

[30] Foreign Application Priority Data

Apr. 11, 1997 [JP] Japan .................................. 9-110342

[51] Int. Cl.⁶ ............................ H02K 5/16; H02K 37/14
[52] U.S. Cl. ........................................ 310/90; 310/49 R
[58] Field of Search .................................... 310/49 R, 90, 310/261; 384/517, 518

[56] References Cited

U.S. PATENT DOCUMENTS

Re. 25,992  3/1966  Molitor ..................................... 310/37
4,438,361  3/1984  Manson ..................................... 310/90

*Primary Examiner*—Clayton E. LaBalle
*Attorney, Agent, or Firm*—Oliff & Berridge, PLC

[57] ABSTRACT

A cup shaped base 12 and a cap 13 are coupled, therein coil spring 14 is accommodated to form a holder 11, and the holder is interposed between the bearing 3 of a rotor shaft 4 and a sleeve 5. Different from being directly mounted on the rotor shaft, since the base 12 is provisionally held on the rotor shaft, the operation efficiency at the time of assembling the motor is outstandingly increased.

5 Claims, 6 Drawing Sheets

F I G. 9
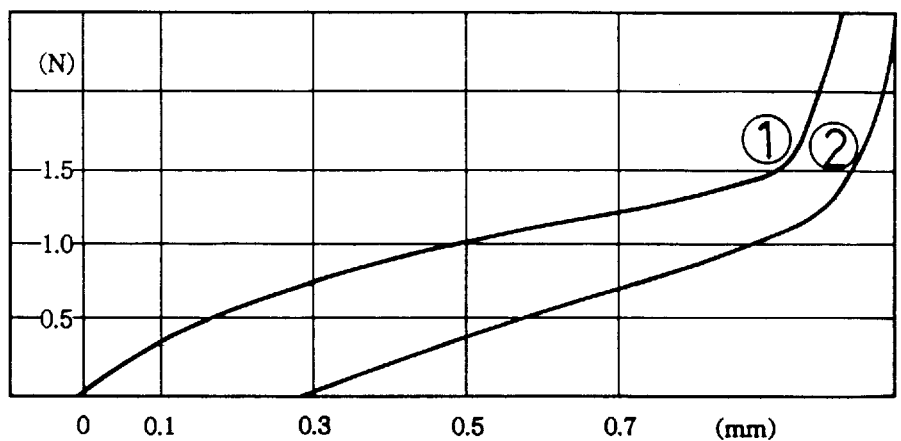
F I G. 10
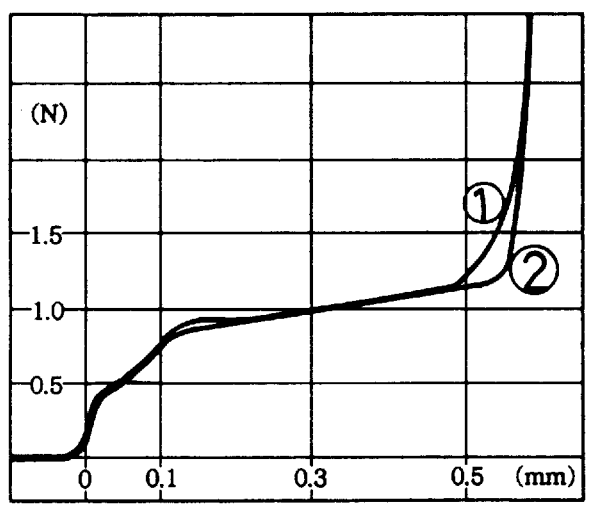

PRESSURIZATION DEVICE FOR THE ROTOR OF A MOTOR

BACKGROUND FOR THE INVENTION

1. Field of the Invention

The present invention relates to a pressurization device for the rotor of a motor, which is applied to a micro motor of the type, in which a magnet is mounted on the rotor shaft and having two layers of stator coils on its outer circumference.

2. Prior Art

One example of a conventional micro motor for use of various applications is explained in accordance with FIG. 8, in which the upper half portion thereof is shown in section to show the inner structure. Reference numeral 1 designates a stator yoke, outside which a bearing 2 is mounted and inside which a bearing 3 is mounted, which support rotatably a rotor shaft 4. On the rotor shaft 4, a sleeve 5 is mounted, around the outer circumference of which a cylindrical magnet 6 is attached. Thereby, the sleeve 5 and the magnet 6 are unified.

The length of the sleeve 5 is shorter than the spacing between the bearings 2 and 3, one end thereof is adjacent to a washer 7 through which the rotor shaft 4 is penetrated and the other end is adjacent to a plate spring 8. The washer 7 is in contact with the bearing 2 and the plate spring 8 is in contact with the bearing 3. Outside the outer circumference of the magnet 6 the inner side of the stator yoke 1 located with a little gap therebetween, and inside the yoke 1 stator coils 9 and 10 are juxtaposed.

In such a conventional micro motor thus formed, when the stator yoke 1 is energized by flowing the alternating current into the coils 9 and 10, the rotor shaft 4 rotates due to the electromagnetic force functioned on the magnet 6 in accordance with a polarizing action thereof. Letting the motor be a stepping motor, if the coils 9 and 10 are flown alternately with a pulse current, the magnet 6 is functioned alternately with the electromagnetic force. When the coils 9 and 10 are flown alternately with the pulse current, the energization of the stator yoke 1 changes on the rotor shaft 4 in the axial direction, since the rotor shaft 4 receives a to and fro force alternately in the axial direction, which causes the rotor shaft 4 to be in a unstable location and to vibrate, as a result a noise is generated.

Then, in order to avoid this, by pressing the sleeve 5 to the bearing 2 through the washer 7 due to the function of the plate spring 8 put on the end portion of the rotor shaft 4, the location of the rotor shaft 4 is fixed in the axial direction. According to the structure shown in FIG. 8, the sleeve 5 is not adapted to be in contact with the bearing 2 directly because the washer 7 on the rotor shaft 4 is interposed between the sleeve 5 and the bearing 2. Accordingly, there is no trouble on the function of the motor.

However, at the time of assembling the motor, if the plate spring 8 put on the rotor shaft 4 is not fixed, it is apt to drop when assembling the rotor shaft in the stator yoke 1. To avoid this trouble, the plate spring 8 to have been adhered by grease to the rotor shaft 4 while assembling, which is not suitable for an automatic assembling process and has to have relied on a hand working. Further, a mere replacement of the plate spring 8 with a coil spring has not improved the assembling work.

Since the spacing between the sleeve 5 of a rotor of a stepping motor and the bearing 3, that is, the dimension precision of the spacing where the plate spring 8 is accommodated depends on the precision of the length of the sleeve 5 and the precision of the spacing between the bearings 2 and 3, the tiny dimension change of the spacing influences greatly the rotor pressurization due to the plate spring 8 and a contact pressure between the sleeve 5 and the rotor shaft 4, as a result to the characteristic of the motor torque.

The relation of a variation (mm) on a load (N), as a representative example of stress variation characteristic of the plate spring, and as a representative example of the coil spring, is shown in FIG. 9 and in FIG. 10 respectively. Comparing these examples, a stress variation curve at the initial use of the plate spring is shown in ① which becomes ② after aging. For instance, at the variation of 0.1 mm–0.5 mm, the load is within 0.35N–1N, and in the case of a coil spring, both in ① and ②, the load shows a little variation of 0.8N –1.2N. Accordingly, when a coil spring is employed for a motor, against the clearance of the space, in which the coil spring is accommodated, the variation of the pressurization decreases.

Therefore, a coil spring, in which the variation of the pressurization due to aging is small and the influence receiving from the space variation is small, is superior and easy to be used.

However, if such a coil spring is mounted without a coil cover or holder as well as a plate spring, the pressurized coil spring biases the rotation force of the rotor in one rotary or one reverse direction by adding a torsion force, which causes a stepping motor to be influenced badly in its angle precision indicating the position precision at every one step and in the torque characteristic.

Then, in the present invention, a coil spring is accommodated in a holder to enable the holder easily to be assembled automatically and the structure is adapted to effect for it to keep the position provisionally after being coupled with the rotor shaft, so that the motor assembly becomes easy and the structure, which does not cause the pressurization added to the rotor to influence badly against the angle precision and the torque characteristic, is provided.

The present invention described in the claim 1 is, to solve the above problem, characterized in that a cup-shaped base and cap are adapted to be coupled to accommodate therein a coil spring, which form a holder, and said holder is interposed between a bearing of the rotor shaft and a sleeve.

The invention described in the claim 2, in the invention described in the claim 1, is characterized in that said base and cap are made of plastic material, at the bottom center of one of them, a non-circular opening having the diameter a little smaller than the diameter of the rotor shaft is provided and at the opposite bottom center a circular opening having a diameter a little larger than the diameter of the rotor shaft is provided.

The invention described in the claim 3, in the inventions described in the claims 1 or 2, is characterized in that one portion of said base is provided with an elongated aperture along the rotor shaft and the cap is provided with a click to allow to slide in that aperture within a given range thereof and to engage with the end of the aperture.

The invention described in the claim 4, in either one of the inventions described in the claims 1 to 3, is characterized in that the material of said holder is made of thermoplastic resin.

The invention described in the claim 5, in the invention described in either one of the claims 1 to 4, is characterized in that said cap is adapted to be coupled with the holder with having a clearance.

Since the base and the cap of the holder is coupled with a sufficient clearance and covers a coil spring, the base and cap of the holder are freely expanded and contracted in the state where the coil spring is accommodated therein to function resiliently. Further, since the diameter of the opening for inserting the rotor shaft and holding the holder thereon is a little smaller than the one of the rotor shaft, when the holder is put on the rotor shaft, it is in the state of half-fixed and held provisionally thereon, so that it is not easily removed therefrom.

BRIEF EXPLANATION OF THE DRAWINGS

FIG. 9 is a graph showing a stress variation curve of the plate spring.

FIG. 10 is a graph showing a stress variation curve of the coil spring.

EMBODIMENT

Figure 1:
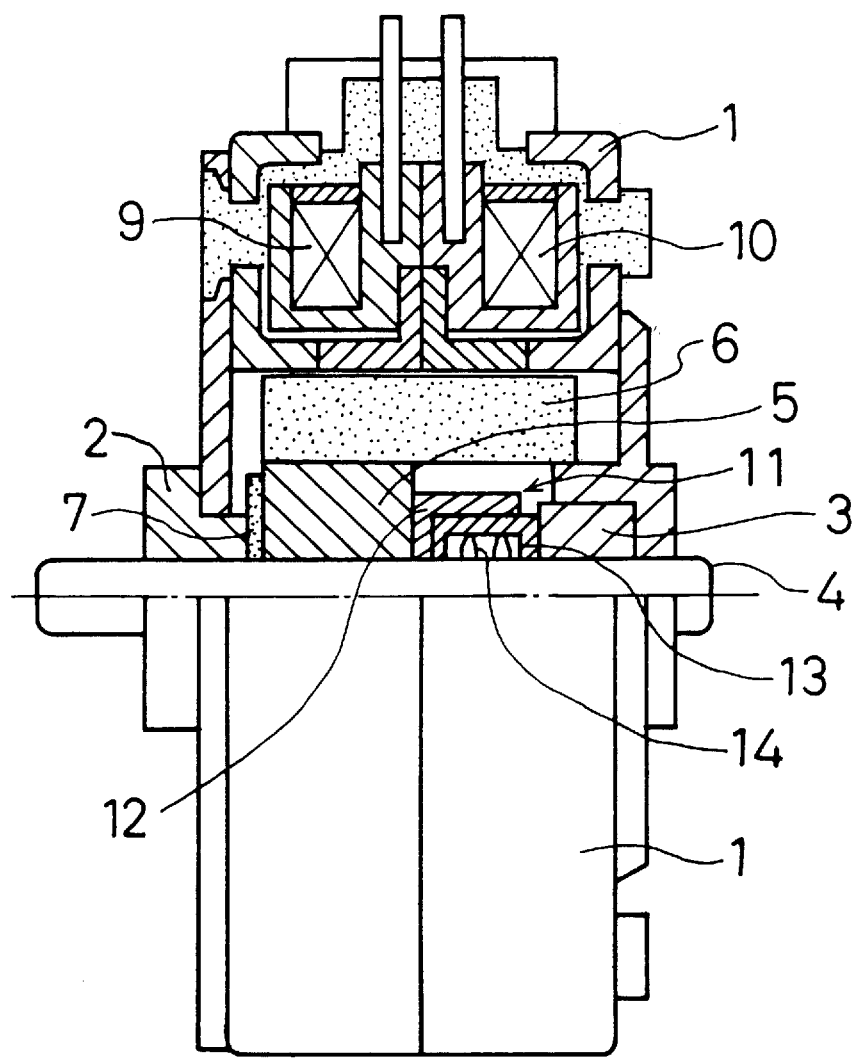
FIG. 1 is an embodiment of the present invention shown in a half-sectional view.
Figure 8:
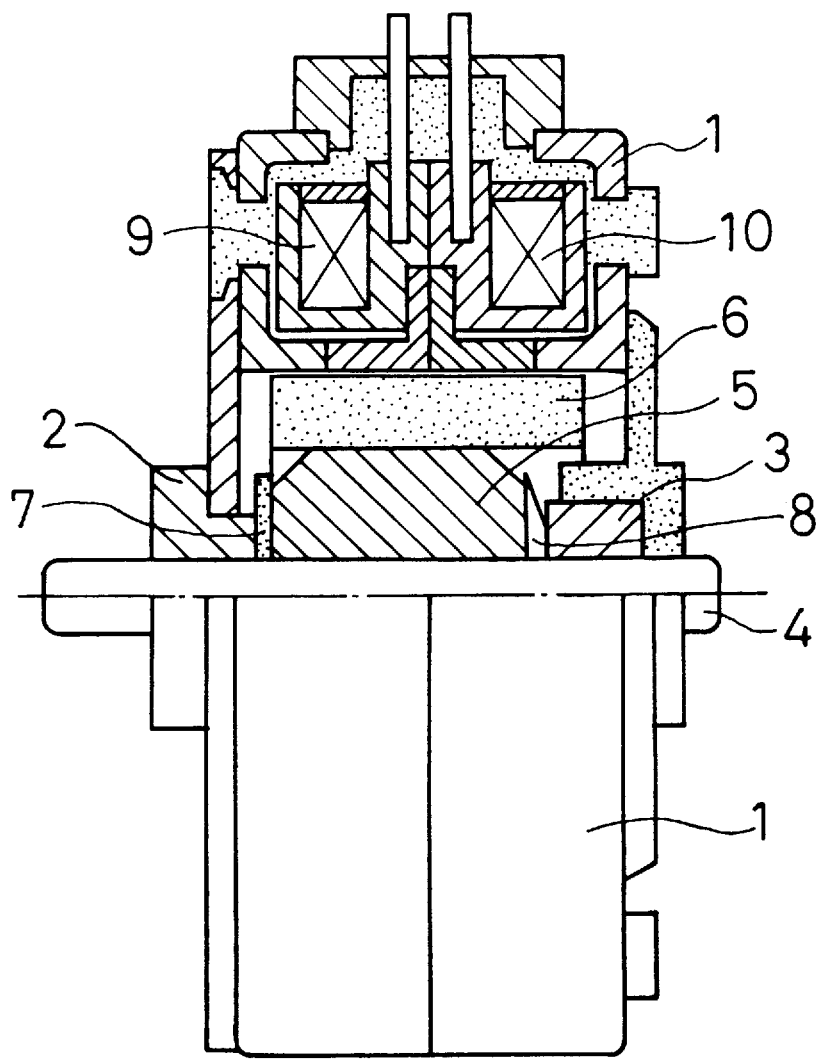
FIG. 8 is a half-sectional view of a conventional motor structure.

Hereinafter, referring to FIG. 1, an embodiment of the present invention is explained, whereby the same parts such as in FIG. 8 are illustrated in the same reference signs. Reference numeral 1 is a stator yoke, which supports a rotor shaft 4 rotatably by a bearing 2 fastened outside the stator yoke and a bearing 3 fastened inside the stator yoke. The rotor shaft 4 is fastened with a sleeve 5, and on the outer circumference of which, a cylindrical magnet 6 is mounted. So that sleeve 5 and the magnet 6 is unified.

The length of the sleeve 5 is adapted to be approximately half of the distance between the bearings 2 and 3, and one end of the sleeve 5 is in contact with a washer 7 penetrated by the rotor shaft 4 and the other end thereof is in contact with a holder 11 of the present invention.

On the other hand, the washer 7 is in contact with the bearing 2 and the holder 11 is in contact with the bearing 3, and on the outer circumference of the magnet 6, an inner circumference of the stator yoke 1 is located interposing a little gap therebetween, and inside the stator yoke 1, stator coils 9 and 10 are juxtaposed. The holder 11 is formed with a cup-shaped base 12 and a cap 13 accommodates a coil spring therein. The structure of the holder 11 is explained referring to FIGS. 2–7.

Figure 2:
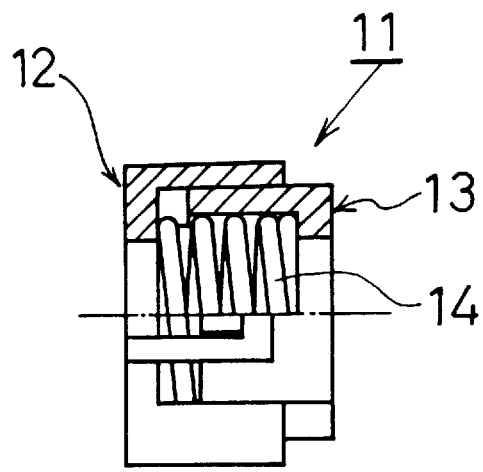
FIG. 2 is a half-sectional view of a holder of the present invention.
Figure 3:
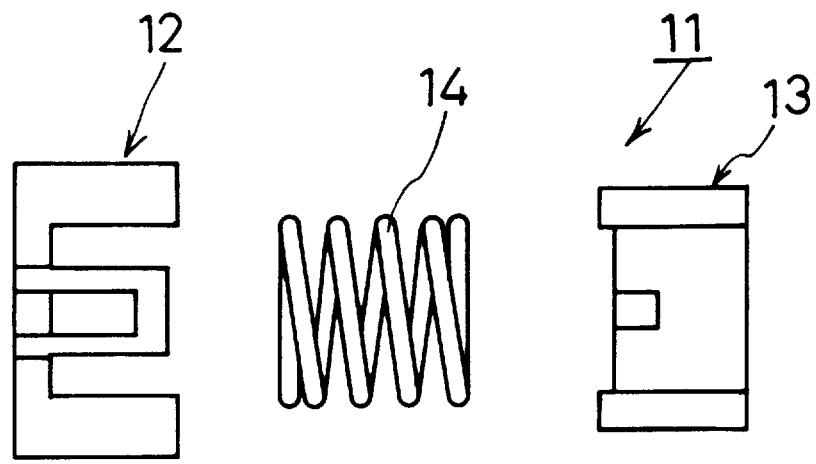
FIG. 3 is a broken side view of the holder shown in FIG. 2.
Figure 4:
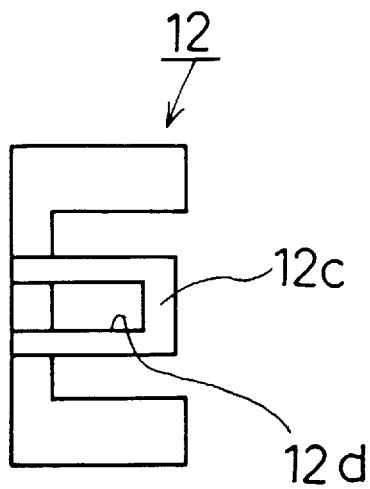
FIG. 4 is a side view of the base of the holder.
Figure 5:
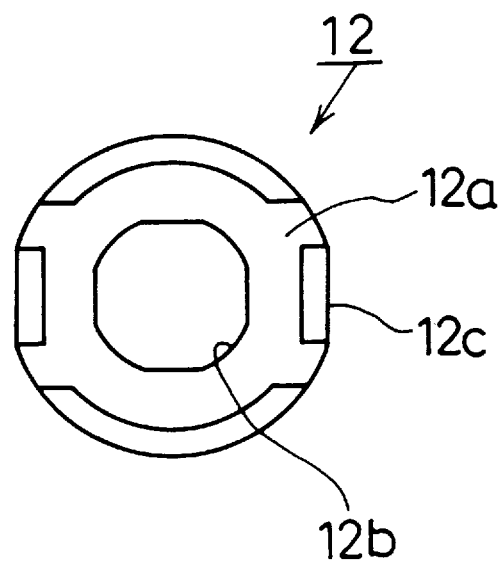
FIG. 5 is a front view which is taken from the right side of FIG. 4.
Figure 6:
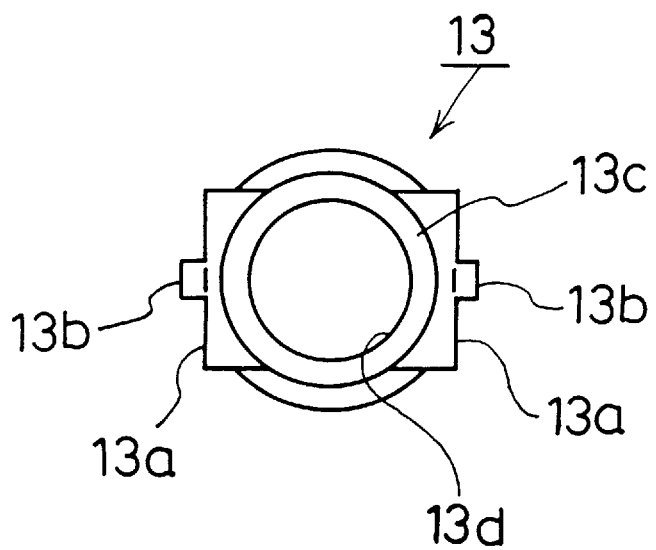
FIG. 6 is a front view of the cap of the holder.
Figure 7:
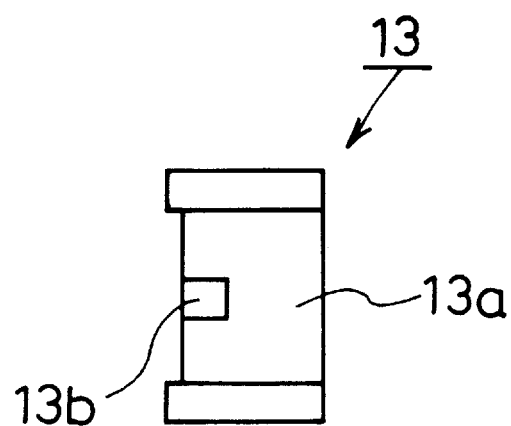
FIG. 7 is a side view of FIG. 6.

FIG. 2 shows the state of the holder 11 where the base 12 and the cap 13 are coupled and accommodate the coil spring 14 therein, and FIG. 3 is the broken state thereof. FIG. 4 shows the side of the base 12, FIG. 5 is a front view thereof, FIG. 6 is a front view of the cap 13 and FIG. 7 shows the side thereof. Both of the base 12 and the cap 13 are formed in cup-shape using a plastic superior in molding.

The base 12 is, as shown in FIG. 5, circular in front view and at the center of the bottom 12a an approximately octagonal hole 12b is provided, which is formed by cutting four corners of a square. In this hole 12b the rotor shaft 4 (see FIG. 1) is inserted. Since the minimum diameter of the octagonal hole 12b (at the portions other than apexes of the octagon) is a little smaller than the diameter of the rotor shaft 4, the octagonal shape is deformed by being pushed and opened with the rotor shaft 4 into a circular shape in accordance with the diameter of the rotor shaft 4 due to the elasticity of the plastic, thereby the rotor shaft 4 can pass through the opening. Whereby, the base 12 is provisionally held by the rotor shaft 4.

As shown in FIG. 4, there is a plate shaped holder fixer 12c, which is provided with an aperture 12d which is along with the axial direction. Into this aperture 12d a pawl portion 13b (see FIGS. 3, 6 and 7) provided on the side 13a of the cap 13 is adapted to be coupled. When being coupled, since the pawl portion 13b is allowed to be displaced within the range of the aperture 12d of the fixer 12c, the total length of the holder 11 can be changed. The pawl portion 13b engages with the end of the aperture 12d.

The cap 13 also is made of the same material to the base 12 and adapted to be inserted therein with a little clearance and coupled with it. Due to the clearance thus provided and the nature of the plastic, at the time of coupling the cap 13 widens the fixer 12c outward, and after sliding on the inner side of the fixer 12c, the cap 13 couples in the aperture 12d. On the other hand, at the center of the bottom 13c (see FIG. 6) of the cap 13 a circular opening 13d, the diameter of which is a little larger than the diameter of the rotor shaft 4 (FIG. 1), is provided. Thereby, it becomes easy to put the holder 11 on the rotor shaft 4. When mounting the holder 11 on the rotor shaft 4 of the motor, after assembling the holder by accommodating the coil spring 14 between the base 12 and the cap 13, first the rotor shaft 4 is inserted in the opening 12b of the bottom 12a of the base 12. As mentioned above, then, since a fastening force on the rotor shaft 4 is generated, at the time of putting the holder 11 on the rotor shaft 4, by making use of this force, a provisional holding is carried out. Next, the sleeve 5 is mounted and by assembling the rotor shaft 4 together with the washer 7 between bearings 2 and 3, the assembly is finished. It is same to a conventional one to generate a rotary force by applying the electric power to the coils 9 and 10.

In the embodiment mentioned above, as the configuration of the opening 12b of the bottom 12a of the base 12, an octagonal one is illustrated, which is formed based on the figure to be obtained by cutting four corners of a square, however the configuration of the opening 12b is not limited to this. In essentials, it may be sufficient that the holder is kept provisionally on the rotor shaft 4 after inserting the rotor shaft by adding a slight force. The material for forming the base 12 and the cap 13 are appropriate if these are flexible to some extent and small in the coefficient of friction between the holder and bearings. In the example of this invention, POM resin is used.

According to the structure of the pressurization device of the present invention thus explained, it becomes possible to employ a coil spring for a stepping motor, under which it is expected to obtain a good result without receiving a torsion thereof. And, in this case, when assembling the holder to the rotor shaft, due to the fastening force of the base on the rotor shaft, it is held provisionally on the rotor shaft, and that, since it is configured appropriately for an automatic assembly, the automatic assembly of the motor become possible.

What is claimed is:

1. A rotor pressurization device for a motor, comprising:
   a crown-shaped base and cap to be coupled through a spring with each other concentrically on the rotor shaft;

a fixer extending in an axial direction, provided on a coupling surface of said base; and a pawl portion to be engaged with the fixer, provided on a coupling surface of said cap, wherein the fixer allows an axial movement of said cap and prevents rotation thereof.

2. A rotor pressurization device for a motor according to the claim 1, wherein said base and cap are made of a plastic, at the center of the bottom of one of which is provided a non-circular opening having a diameter a little smaller than the diameter of the rotor shaft, and at the center of the bottom of the opposite one of which is provided a circular having the diameter a little larger than the diameter of the rotor shaft.

3. A rotor pressurizing device for a motor according to the claim 1, wherein said base comprises apertures along the axial direction of the rotor and said cap is provided with a pawl portion to be coupled in the aperture and allowed toslide within a given range, to engage with the end of the aperture.

4. A rotor pressurizing device for a motor according to claim 1, wherein material of said holder is a thermoplastic.

5. A rotor pressurizing device for a motor according to claim 1, wherein said cap is coupled with the base with a clearance.

\* \* \* \* \*